(12) United States Patent
Rioux et al.

(10) Patent No.: US 12,157,210 B2
(45) Date of Patent: Dec. 3, 2024

(54) METHOD AND DEVICE FOR INSTALLING/REMOVING A SEAL

(71) Applicant: Fabrice Rioux, Bazouges Cre-sur-Loir (FR)

(72) Inventors: Fabrice Rioux, Bazouges Cre-sur-Loir (FR); Bruno Drouet, Mezieres sous Lavardin (FR)

(73) Assignee: Fabrice RIOUX, Bazouges Cre-sur-Loir (FR)

( * ) Notice: Subject to any disclaimer, the term of this patent is extended or adjusted under 35 U.S.C. 154(b) by 0 days.

(21) Appl. No.: 18/027,052

(22) PCT Filed: Sep. 9, 2021

(86) PCT No.: PCT/FR2021/051548
§ 371 (c)(1),
(2) Date: Mar. 17, 2023

(87) PCT Pub. No.: WO2022/064119
PCT Pub. Date: Mar. 31, 2022

(65) Prior Publication Data
US 2023/0321802 A1 Oct. 12, 2023

(30) Foreign Application Priority Data
Sep. 28, 2020 (FR) ..................... 20 09843

(51) Int. Cl.
*B25B 27/00* (2006.01)
*A47J 31/06* (2006.01)

(52) U.S. Cl.
CPC ....... *B25B 27/0028* (2013.01); *A47J 31/0684* (2013.01)

(58) Field of Classification Search
CPC ............................ B25B 27/0028; B25B 27/00
See application file for complete search history.

(56) References Cited

U.S. PATENT DOCUMENTS

| | | | |
|---|---|---|---|
| 118,823 A * | 9/1871 | Smade ................ | B25B 27/0028 294/26 |
| 1,195,220 A * | 8/1916 | Hendren ............. | B25B 27/0028 29/263 |

(Continued)

FOREIGN PATENT DOCUMENTS

| | | | | |
|---|---|---|---|---|
| FR | 2 992 247 | 12/2013 | | |
| FR | 2992247 A1 * | 12/2013 | ......... | B25B 27/0028 |

OTHER PUBLICATIONS

International Search Report dated Jun. 18, 2021.

*Primary Examiner* — Jason L Vaughan
*Assistant Examiner* — Amanda Kreiling
(74) *Attorney, Agent, or Firm* — IPSILON USA, LLP (57) ABSTRACT

Device (1) for installing/removing a seal (12) for an injection group of a coffee machine, comprising a body (2) which is elongate along a longitudinal axis (XX'), a handle (3) for gripping the body (2) and two rows of lugs (4), one of which is arranged at one end and the other of which is arranged at the other end of the elongate body (2). Each lug (4) of a row, which is radial relative to the body (2), is arranged around the body (2) on a centre circle which passes through the longitudinal axis (XX') of the body (2), and each lug (4) of a row has a face (41) which is called the internal face and which is directed towards the lugs (4) of the other row and which forms a helical ramp (5) which is inclined to allow, in the positioned state of the ramps (5) of a row of lugs (4) in bearing contact with inclined surfaces forming ramps with complementary shapes, and, in the state in which the body (2) is rotated about its longitudinal axis (XX'), axial displacement of the body (2). One of the ends (6), which is called the seal installing end, of the body (2) is provided with a rotating plate (7) for receiving a seal (12) to be installed.

(Continued)

The opposite end of the body (2) is provided with anchoring members (9) which project from the aforementioned end (8).

10 Claims, 7 Drawing Sheets

(56) References Cited

U.S. PATENT DOCUMENTS

| | | | | |
|---|---|---|---|---|
| 1,968,640 | A | * | 7/1934 | Elms .................. B25B 27/0028 157/1.22 |
| 3,165,949 | A | * | 1/1965 | Thill .................. B25B 27/0028 29/275 |
| 5,634,394 | A | | 6/1997 | Cortese |
| 9,703,069 | B2 | | 7/2017 | Sato |
| 2006/0000315 | A1 | | 1/2006 | Patterson |

* cited by examiner

METHOD AND DEVICE FOR INSTALLING/REMOVING A SEAL

RELATED APPLICATION

This application is a National Phase of PCT/FR2021/051548 filed on Sep. 9, 2021, which claims the benefit of priority from French Patent Application No. 20 09843, Sep. 28, 2020, the entirety of which are incorporated by reference.

FIELD OF THE INVENTION

The present invention relates to a method and a device for installing/removing a seal, notably a seal of a coffee machine injection group.

PRIOR ART

Coffee machines for producing espresso, such as those marketed, for example, under the trade name Conti (registered trademark) and used in particular in restaurants or in cafes or the like, are well known to those skilled in this art. These coffee machines can have one or more groups, each group forming a cavity housing a shower rose and a diffuser. A filter-holder can be coupled to each group and a removable seal is provided at the bottom of the cavity of the group. This seal must be changed regularly. This seal is force-fitted into an annular groove with which the bottom of a cavity delimited by the group is fitted. Hitherto, this seal has been mounted or dismounted manually. Since the group can be raised to a temperature of 120°, the group has to be left to cool before the seal can be changed, which can result in a significant downtime of the coffee machine. Moreover, the total cooling is never guaranteed, so there is a risk of burns for the operator in such a seal installation or removal operation. Finally, the positioning of the coffee machines on counters often requires contortions on the part of the operator to have access to the inside of the group. Consequently, and for the reasons mentioned above, the operation of mounting or of dismounting a seal of the group is lengthy and tedious.

OBJECTS AND SUMMARY

One aim of the invention is to propose a seal installation/removal device, notably for a seal of a coffee machine injection group, the design of which makes it possible to proceed with the installation, that is to say the mounting, or with the removal, that is to say the dismounting, of the seal, quickly and without the risk of burns.

Another aim of the invention is to propose a seal installation/removal device, notably for a seal of a coffee machine injection group, the design of which makes it possible to proceed with the installation, that is to say the mounting, or with the removal, that is to say the dismounting, of the seal, without needing to wait for the group of the coffee machine to cool down.

To this end, one subject of the invention is a device for installing/removing a seal, notably a seal of an injection group of a coffee machine, characterized in that said device comprises a so-called elongate body extending from one of its ends toward its opposite end along a longitudinal axis, a handle for gripping said body extending at least radially with respect to said body, and two series of lugs, one of which is arranged at one of the ends, the other of which is arranged at the other of the ends of said elongate body, in that each lug of a series, which is radial with respect to said body, is arranged around said body at least partially on a circle of center positioned on the longitudinal axis of said body, in that each lug of a series has a so-called inner face turned toward the lugs of the other series and an opposite outer face, in that the inner face of the or of at least two of the lugs of each series forms an inclined helical ramp to allow, when the ramps of a series of lugs are in the state positioned in bearing contact with ramp-forming inclined surfaces of complementary forms and, when said body is in the state driven in rotation about its longitudinal axis, an axial displacement of said body, in that one of the ends, called seal installation end, of said body is provided with a plate for receiving a seal to be installed, in that said plate is a plate revolving about an axis coinciding with the longitudinal axis of said body, and in that the end of the body opposite the seal installation end and called seal removal end of said body is provided with anchoring members protruding from said end. The design of the device therefore makes it possible, by simply rotationally driving the body gripped by a handle that is radial to said body, to proceed with the mounting or the dismounting of the seal. The risk of burns is therefore considerably reduced and the operation can be performed without waiting for the group of the coffee machine to cool down.

According to one embodiment of the invention, the anchoring members are arranged on a circle of center positioned on the axis of rotation of the revolving plate. The result thereof is simplicity of implementation by simple rotation of the body.

According to one embodiment of the invention, the seal removal end of said body has a flat surface and the anchoring members take the form of snugs or of hooked teeth protruding from said flat surface. This arrangement makes it possible to guarantee easy anchoring of the anchoring members in the flexible seal which is generally elastically deformable.

According to one embodiment of the invention, said gripping handle forms a stick.

According to one embodiment of the invention, the stick is a telescopic stick. By virtue of this design, access to locations of groups that are that are difficult to access is facilitated.

According to one embodiment of the invention, the revolving plate is provided with a circular protuberance delimiting, on the surface of the plate, a circular recess. The presence of such a protuberance facilitates the positioning by the operator of the seal on the device. The result thereof is an additional time saving and a guarantee of optimal positioning of the seal.

According to one embodiment of the invention, the inclined ramps of the inner faces of the lugs are inclined to extend in parallel from one series of lugs to another when the inclinations of the slopes are identical.

Another subject of the invention is a method for installing a seal of a coffee machine group, said group defining an open cavity, the bottom of which is provided with an annular groove for receiving the seal to be installed, the entry of the cavity, opposite said bottom, being provided with an internal circumferential wing with a face turned toward the bottom of the cavity, this face of the wing turned toward the bottom of the cavity being provided with inclined surfaces forming ramps that are separated from one another by apertures in the form of notches formed in said wing, characterized in that the method comprises, for the installation of the seal using a device of the abovementioned type, a step of positioning of the lugs of the installation end opposite the notches of the group and of axial introduction of the revolving plate pre-fitted with the seal to be installed inside the cavity before driving said body in rotation about its longitudinal axis in a first direction of rotation to generate, by cooperation of the ramp-forming inclined surfaces of the wing with the inclined helical ramps of complementary form of the lugs of the body, an axial displacement of the body in the direction of convergence of the installation end of the body with the bottom of the cavity until the seal resting on the revolving plate is inserted into the annular groove. The result thereof is that the seal is mounted quickly and without the risk of burns to the operator.

According to one implementation of the method, the method comprises, after the step of driving of said body in rotation about its longitudinal axis in a first direction of rotation, a step of driving of the body in rotation about its longitudinal axis in a second direction of rotation opposite the first direction of rotation to generate, by cooperation of the ramp-forming inclined surfaces of the wing with the inclined helical ramps of complementary form of the lugs of the body, an axial displacement of the body in the direction of separation of the installation end of the body from the bottom of the cavity of the group until the lugs of the removal end of the body are positioned opposite the notches of the wing in order for the body to be extracted axially from the interior of the cavity.

Another subject of the invention is a method for installing a seal of a coffee machine group, said group defining an open cavity, the bottom of which is provided with an annular groove for receiving the seal to be dismounted, the entry of the cavity, opposite said bottom, being provided with an internal circumferential wing with a face turned toward the bottom of the cavity, this face of the wing turned toward the bottom of the cavity being provided with inclined ramps separated from one another by apertures in the form of notches formed in said wing, characterized in that the method comprises, for the dismounting of the seal using a device of the abovementioned type, a step of positioning of the lugs of the removal end opposite the notches of the wing and of axial introduction of the body into the cavity of the group, a step of driving of the body in rotation about its longitudinal axis in a first direction of rotation to generate, by cooperation of the ramp-forming inclined surfaces of the wing with the inclined helical ramps of complementary form of the lugs of the body, an axial displacement of the body in the direction of convergence of the removal end of the body with the bottom of the cavity of the group and consequently, the engagement of the anchoring members of the removal end of the body with the seal to be dismounted and a step of driving of the body in rotation about its longitudinal axis in a second direction of rotation opposite the first direction of rotation to generate, by cooperation of the ramp-forming inclined surfaces of the wing with the inclined helical ramps of complementary form of the lugs of the body, an axial displacement of the body in the direction of separation of the removal end of the body from the bottom of the cavity of the group until the lugs of the removal end of the body are positioned opposite the notches of the wing in order for the body to be extracted axially from the interior of the cavity. The result thereof is that the seal is dismounted quickly and without the risk of burns to the operator.

BRIEF DESCRIPTION OF THE DRAWINGS

The invention will be well understood on reading the following description of exemplary embodiments, with reference to the attached drawings in which.

DETAILED DESCRIPTION

Figure 1:
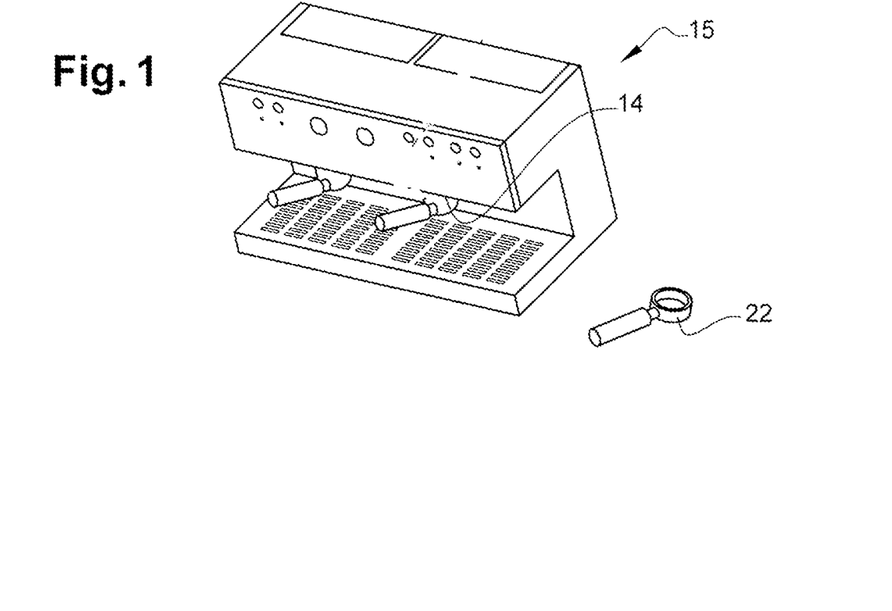
FIG. 1 represents a perspective view of a coffee machine conforming to the state of the art.
Figure 4:
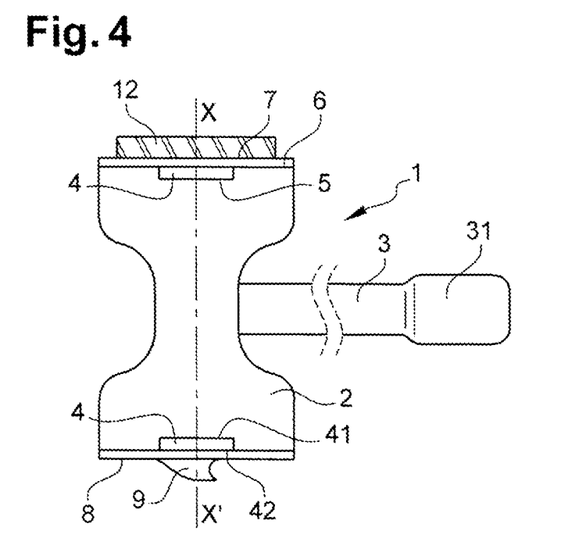
FIG. 4 represents a front schematic view of a seal installation/removal device conforming to the invention.
Figure 5:
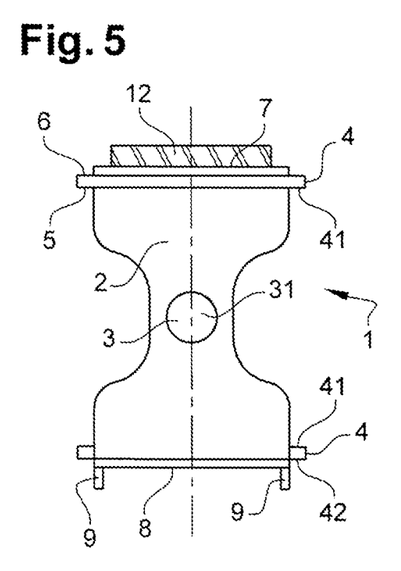
FIG. 5 represents a side schematic view of a seal installation/removal device conforming to the invention.

As mentioned above, one subject of the invention is a seal installation/removal device 1 of the type of that represented for example in FIGS. 4 and 5 and the associated method in order for a seal 12 to be installed in or removed from a coffee machine 15, such as that illustrated in FIG. 1. This coffee machine 15 comprises, as is known per se, one or more groups 14. The coffee machine 15 represented is a machine with two groups. Each group 14 is fixed to the frame of the coffee machine 15 and a filter-holder 22 can be coupled to said group 14.

Figure 2:
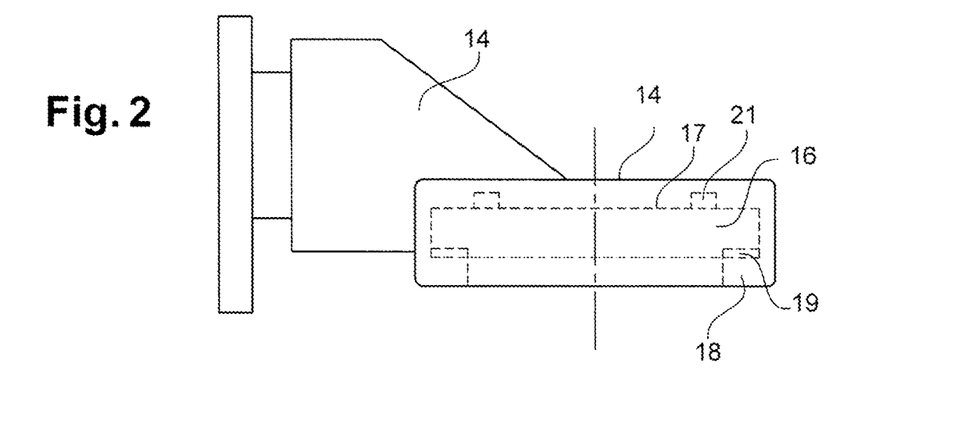
FIG. 2 represents a partial cross-sectional view of a group of the coffee machine of FIG. 1, the filter-holder having been omitted.
Figure 3A:
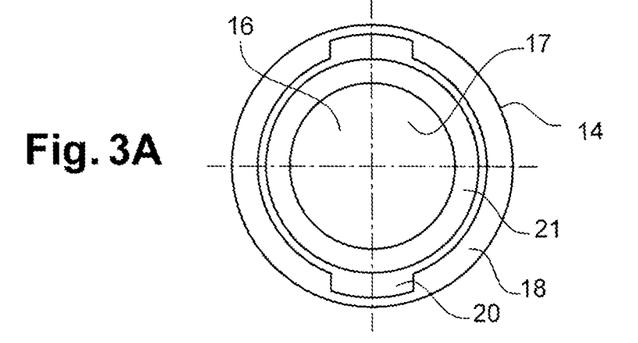
FIG. 3A represents a partial bottom view of a group of a coffee machine conforming to FIG. 1.

As is known per se, the group 14 defines, as illustrated in FIG. 2, an open cavity 16 with a bottom 17 and an entry. The bottom and the entry are arranged at least partially opposite one another and are linked to one another by a peripheral lateral wall. The cavity 16 is circular. The bottom 17 of the cavity is provided with an annular groove 21 for receiving the seal 12 to be installed. This seal 12 can be a circular annular flat seal. This annular groove 21 and the entry of the cavity 16 which comprises a circular aperture are coaxial. This entry is provided with a wing 18 formed by a return, toward the interior of the cavity 16, of the peripheral lateral wall of the cavity 16. This internal circumferential wing 18 has a face turned toward the bottom 17 of the cavity 16 and an opposite face. The face of the internal circumferential wing 18 turned toward the bottom 17 of the cavity 16 is provided with ramp-forming inclined surfaces 19. These inclined surfaces 19 each tend to form a helical ramp extending along a segment of the internal circumferential wing 18. Specifically, the wing 18 is a discontinuous wing having apertures forming notches 20 in said wing as illustrated in FIG. 3A. Each inclined surface 19 is formed on a segment of the wing 18 extending between two apertures and develops from one aperture toward the nearest aperture so as to tend, for example, to form an inclined surface that approaches, with distance from one end toward the opposite end thereof, the bottom 17 of the cavity. In the example represented, the wing comprises two apertures in the form of notches 20 and therefore two inclined surfaces 19 forming ramps with identical slopes the same direction, that is to say, for example, ascending slopes when moving over a revolution following the wing and passing from one aperture to another of said wing.

This construction is perfectly conventional to allow a coupling with a filter-holder 22 which comprises radial lugs with inclined ramps of a form complementing the inclined surfaces 19 described above.

Figure 3B:
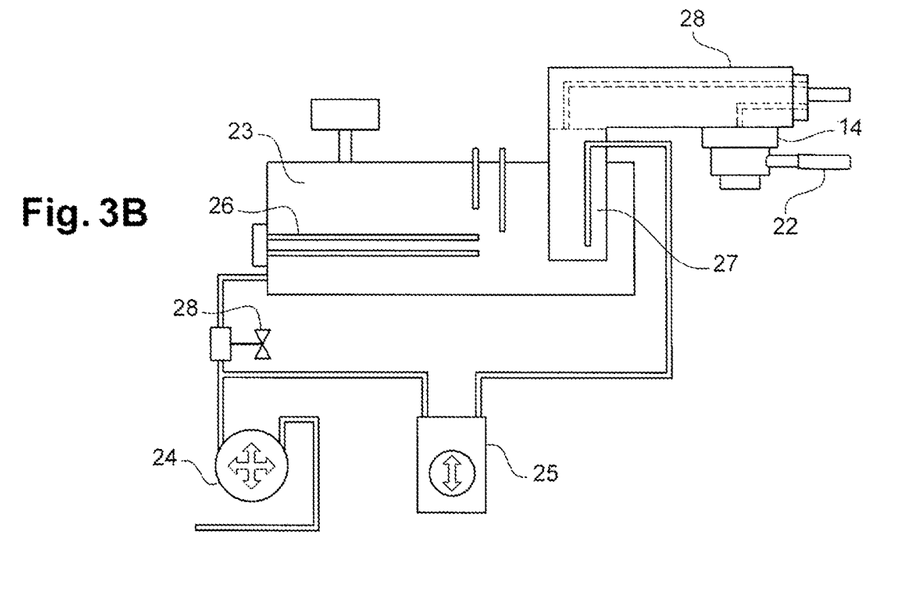
FIG. 3B represents a schematic view of an example of the principle of operation of a coffee machine conforming to FIG. 1.

The basic elements of such a coffee machine 15 are perfectly known and are, to recap, illustrated in FIG. 3B which shows an example of a coffee machine comprising a water reserve tank represented as 23 in the figures, a pump represented as 24, a flowmeter represented as 25, heating elements 26, such as electrical resistors, for heating the content of the water tank 23 and an immersion heater 27. Finally, a pressure stat and solenoid valves represented as 28 are provided. The operation of such a machine will not be described because it is well known to those skilled in this art.

Such a coffee machine 15 comprises, for each group 14, a dismantlable shower rose housed inside the cavity of the group, this shower rose being supplied with hot water by the rest of said coffee machine 15 for the purposes of percolation through the filter-holder 22 that can be coupled to the group and which comprises the ground coffee to be prepared and a filter of strainer type.

As mentioned above, the object of the device 1, a subject of the invention, is therefore to allow the installation, that is to say the mounting or the removal, that is to say the dismounting of the seal or seals 12 with which the group or groups 14 of such a coffee machine 15 are fitted. This device 1 for example conforms to that represented in FIGS. 4 and 5. This device 1 therefore comprises an elongate body 2 which extends from one of its ends toward its other end along a longitudinal axis XX'. This elongate body 2 here takes the form of a cylindrical body of circular section which flares from its median portion toward its ends to form two widened ends of said body 2. Each end face of said body is, here, produced flat.

This device 1 comprises also a gripping handle 3 which is connected to the body in the median part of said body 2. This gripping handle 3 which extends radially with respect to the body 2 here forms a stick 31 which, in addition, is of adjustable length. This stick 31 is therefore here produced in the form of a telescopic stick.

The device 1 also comprises two series of lugs 4, one of which is arranged at one of the ends and the other of which is arranged at the other of the ends of the elongate body 2. Each series of lugs comprises, in the example represented, two diametrically opposite lugs 4. These lugs 4, which are radial to said body 2, are arranged around said body 2 at least partially on a circle C1 of center positioned on the longitudinal axis)(X' of the body 2. Each lug 4 comprises two faces, namely a so-called inner face 41 turned toward the lugs 4 of the other series and an opposite outer face 42.

As the figures illustrate, the inner face 41 of each lug 4 forms an inclined helical ramp to allow, when the ramps 5 of a series of lugs 4 are in the state positioned in bearing contact with the ramp-forming inclined surfaces 19 of complementary form of the internal circumferential wing 18 of the group 14 and, when said body 2 is in the state driven in rotation about its longitudinal axis XX', an axial displacement of said body 2. This axial displacement of the body 2 thus takes place in the direction of convergence with or separation from the bottom of the cavity 16 of the group 14 depending on the direction in which the body 2 is driven in rotation about its longitudinal axis XX'. Note that the inclined ramps 5 of the inner faces 41 of the lugs 4 are inclined to extend in parallel from one series of lugs 4 to another when the inclinations of the slopes are identical. The opposite face, also called outer face 42 of each lug, is flat so that each lug has, when seen from the front as illustrated in FIG. 4, a thickness which increases from one end toward the other end of said lug 4. The slope of the inclined ramp formed by the inner face 41 of each lug 4 has an angle value corresponding to the angle formed by this said inner face 41 with the longitudinal axis XX' of said body.

Figure 8:
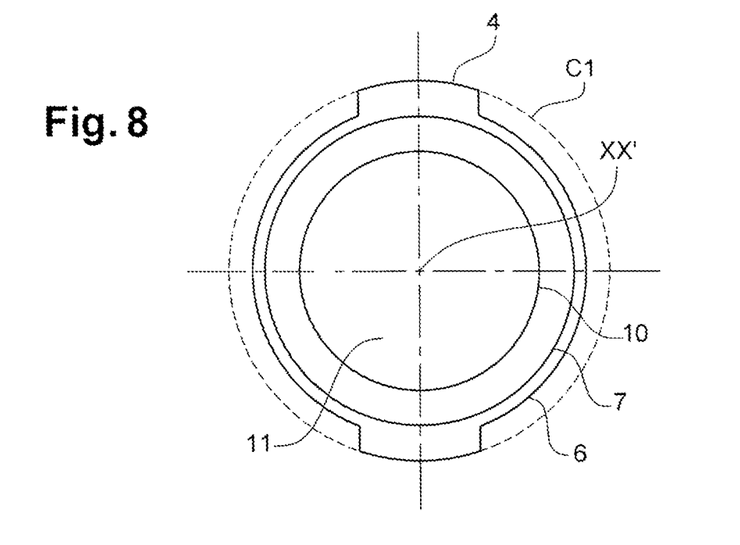
FIG. 8 represents a top schematic view of the seal installation end of said body.
Figure 9:
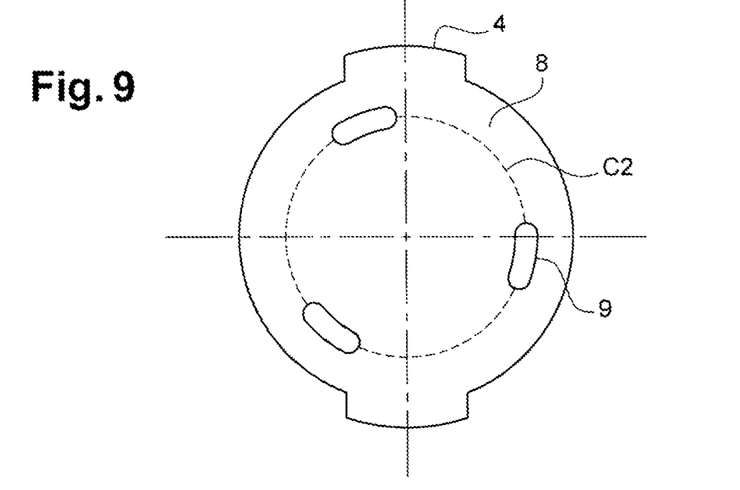
FIG. 9 represents a bottom schematic view of the seal removal end of said body.

The ends of the body 2 each ensure one of the functions of the device 1. Thus, one of the ends, called seal installation end 6 of the body 2, is provided with a plate 7 for receiving a seal 12 to be installed. This plate 7 is a plate revolving about an axis coinciding with the longitudinal axis XX' of the body 2. The end of the body 2 opposite the seal installation end 6 and called seal removal end 8 of said body 2 is, for its part, provided with anchoring members 9 protruding from the end 8. These anchoring members, of which, in the example represented, there are three, are arranged on a circle C2 of center positioned on the axis of rotation of the revolving plate 7 or the longitudinal axis XX' of the body 2. The seal removal end 8 of the body 2 has a flat surface and the anchoring members 9 take the form of snugs or of hooked teeth protruding from said flat surface. Ideally, there are at least six or eight of these anchoring members 9.

On the seal installation end 6 side of the body 2, the revolving plate 7, which is mounted to rotate freely, is provided with a circular protuberance 10 delimiting, on the surface of the plate 7, a circular recess 11. This circular recess 11 facilitates the placement of the seal 12 to be installed on said revolving plate 7.

Figure 6:
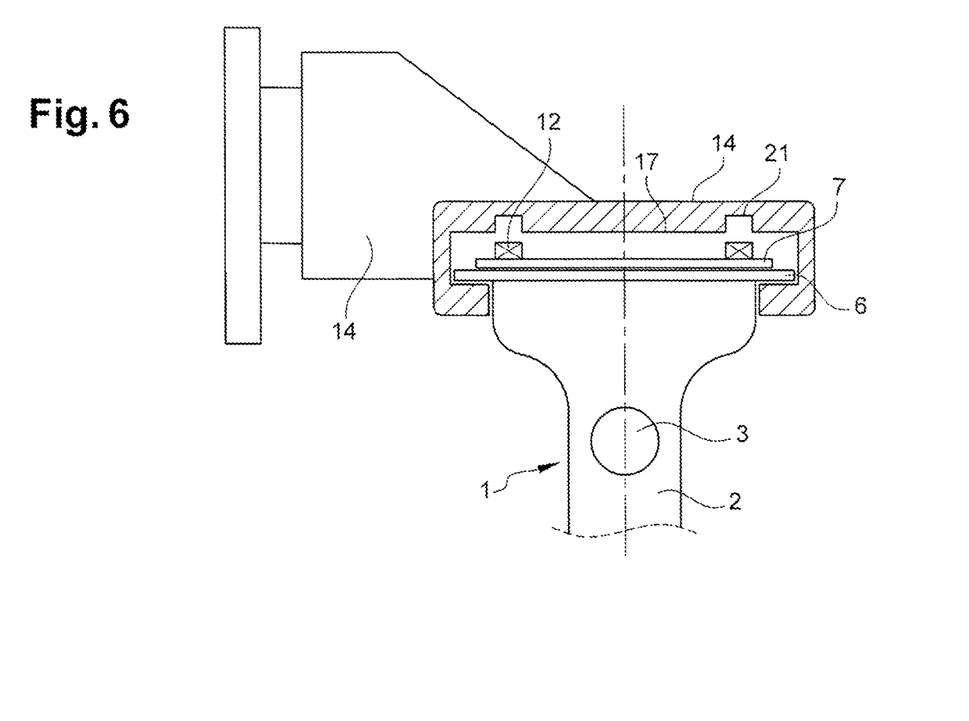
FIG. 6 represents a partial side schematic view of a seal installation/removal device conforming to the invention with the seal installation end of the body of the device in the state inserted into a group of a coffee machine in order for the seal to be installed.

Ideally, the body 2 and the revolving plate 7, like the anchoring members 9, are made of metal. To allow a seal 12 to be installed using a seal installation/removal device 1 of the type of that described above, the procedure is as follows. It is assumed that a seal 12 to be installed is positioned on the revolving plate 7 of the installation end 6 of the body 2 inside the circular recess 11 delimited by the circular protuberance 10. The operator grips the seal installation/removal device 1 by its stick and positions the lugs 4 of the installation end 6 opposite the notches 20 of the group 14. The operator then axially introduces the body 2 and consequently the revolving plate 7 side pre-fitted with the seal 12 to be installed inside the cavity 16 before driving the body 2 in rotation about its longitudinal axis XX' in a first direction of rotation to generate, by cooperation of the ramp-forming inclined surfaces 19 of the wing 18 with the inclined helical ramps 5 of complementary form of the lugs 4 of the body 2, an axial displacement of the body 2 in the direction of convergence of the installation end 6 of the body 2 with the bottom 17 of the cavity 16 until the seal 12 resting on the revolving plate 7 is inserted into the annular groove 21 of the bottom 17 of the cavity 16 of the group. After the step of driving of the body 2 in rotation about its longitudinal axis)(X' in a first direction of rotation, the operator drives the body 2 in rotation about its longitudinal axis XX' in a second direction of rotation opposite the first direction of rotation to generate, by cooperation of the ramp-forming inclined surfaces 19 of the wing 18 of the group 14 with the inclined helical ramps 5 of complementary form of the lugs 4 of the body 2, an axial displacement of the body 2 in the direction of separation of the removal end 8 of the body 2 from the bottom 17 of the cavity 16 of the group 14 until the lugs 4 of the installation end 6 of the body 2 are positioned opposite the notches 20 of the wing 18 of the group 14 in order to then allow, by axial displacement of the body 2, an axial extraction of the body 2 from the interior of the cavity 16. The installation of the seal 12 can thus be done without the risk of burns to the operator and quickly.

Figure 7:
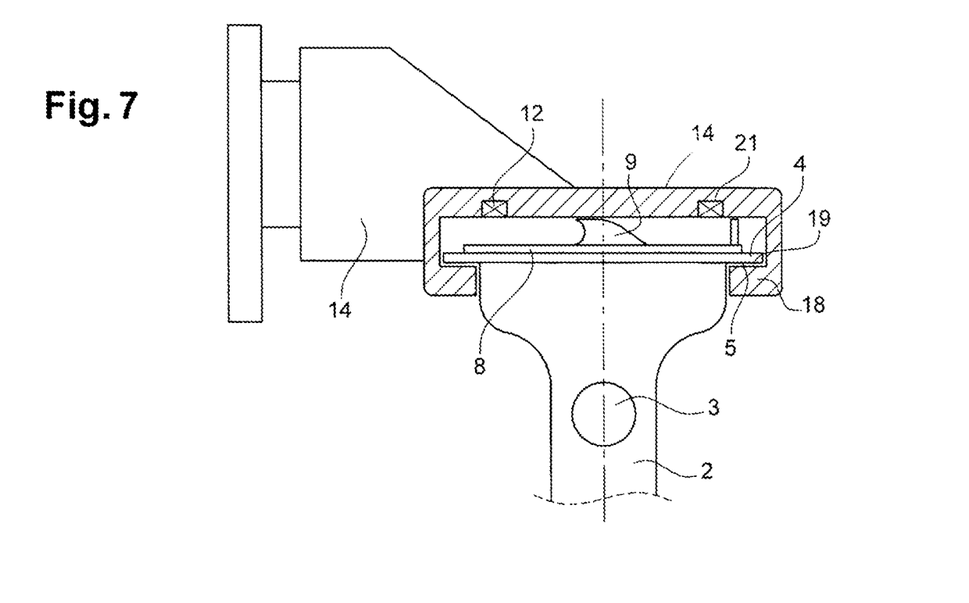
FIG. 7 represents a partial side schematic view of a seal installation/removal device conforming to the invention with the seal removal end of the body of the device in the state inserted into a group of a coffee machine in order for the seal to be removed.

The removal or dismounting of the seal, for its part, is done as follows. The operator grips the seal installation/removal device 1 by the stick and positions the lugs 4 of the removal end 8 opposite the notches 20 of the wing 18. He or she introduces the body 2 axially into the cavity 16 then drives the body 2 in rotation about its longitudinal axis XX' in a first direction of rotation to generate, by cooperation of the ramp-forming inclined surfaces 19 of the wing 18 with the inclined helical ramps 5 of complementary form of the lugs of the body 2, an axial displacement of the body 2 in the direction of convergence of the removal end 8 of the body 2 with the bottom 17 of the cavity 16 of the group 14, and, consequently, the engagement of the anchoring members 9 of the removal end 8 of the body 2 with the seal 12 to be dismounted, the seal 12 being made of an elastically deformable flexible material. The anchoring members simply come to be stuck into said seal. The cooperation of the surfaces 19 and of the ramps 5, for its part, takes place by simple bearing contact. The operator then drives the body 2 in rotation about its longitudinal axis XX' in a second direction of rotation opposite the first direction of rotation to generate, by cooperation of the ramp-forming inclined surfaces 19 of the wing 18 with the inclined helical ramps 5 of complementary form of the lugs 4 of the body 2, an axial displacement of the body 2 in the direction of separation of the removal end 8 of the body 2 from the bottom 17 of the cavity 16 of the group 14 until the lugs 4 of the removal end of the body 2 are positioned opposite the notches 20 of the wing 18 in order for the body 2 to be extracted axially from the interior of the cavity. The seal 12, coupled by the anchoring members 9 to the device 1, is thus extracted from the cavity 16 of the group 14 without the risk of burns to the operator and quickly.

Figure 10:
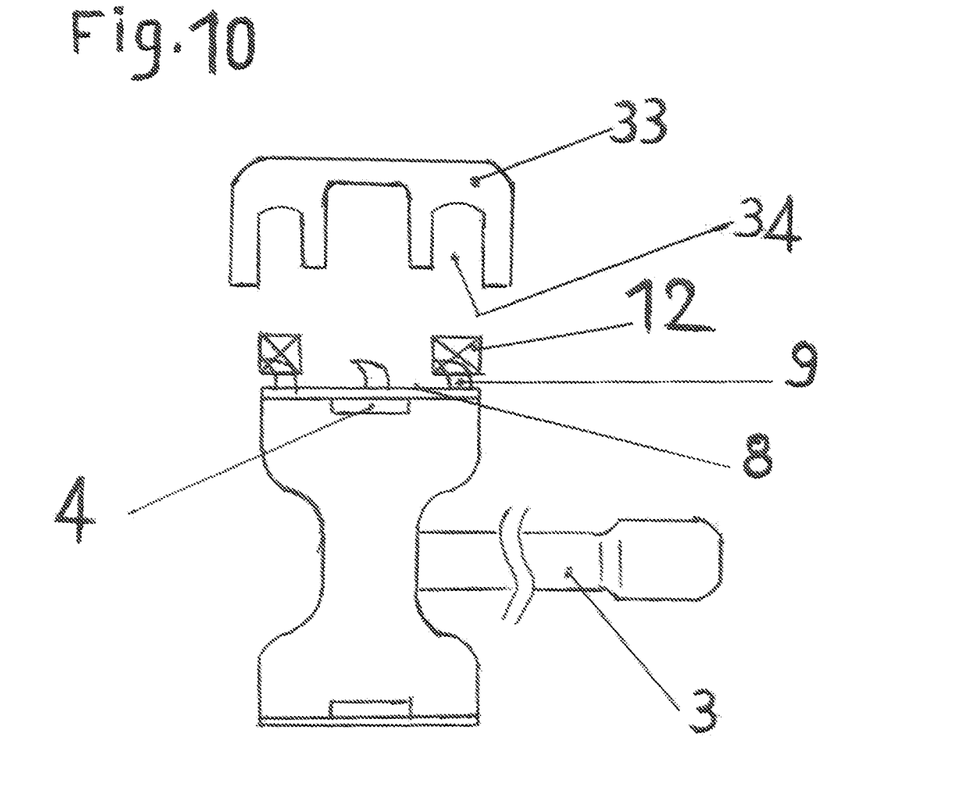
FIG. 10 represents a partial cross-sectional schematic view of a seal installation/removal device conforming to the invention with the seal removal end of the body of the device in the state coupled with a seal, said end being able to be capped by a cover.

To perfect the seal installation/removal device 1, a cover 33 can cover the removal end 8 of the body 2 of the seal installation/removal device 1. This cover 33 makes it possible to assist in separating the seal 12 from the anchoring members 9. It is thus sufficient, once the seal 12 is extracted from the cavity 16 of the group 14, to cap the removal end 8 of the body 2 with the cover 33. This cover 33 comprises a circular groove inside which the seal 12 can be inserted when the cover 33 caps the seal 12. The seal 12 is clamped by the longitudinal edges of the groove. The cover 33 simply has to be driven in rotation to release the seal 12 from the anchoring members 9. The seal 12 can then be removed from the cover 33. This cover 33 can, during periods of non-use of the seal installation/removal device 1, cover the anchoring members 9 to avoid any injury with the anchoring members 9.

The invention claimed is:

1. A device for installing/removing a seal, notably a seal of an injection group of a coffee machine, said device comprising:
a so-called elongate body extending from one of its ends toward its opposite end along a longitudinal axis, a handle for gripping said body extending at least radially with respect to said body, and two series of lugs, one of which is arranged at one of the ends, the other of which is arranged at the other of the ends of said elongate body, in that each lug of a series, which is radial with respect to said body, is arranged around said body at least partially over a circle of center positioned on the longitudinal axis of said body, in that each lug of a series has a so-called inner face turned toward the lugs of the other series and an opposite outer face, in that the inner face of the at least two of the lugs of each series of lugs forms an inclined helical ramp to allow, when the ramps of a series of lugs are in the state positioned in bearing contact with ramp-forming inclined surfaces of complementary forms and when said body is in the state driven in rotation about its longitudinal axis, an axial displacement of said body, in that one of the ends, called seal installation end, of said body is provided with a plate for the reception of a seal to be installed, in that said plate is a plate revolving about an axis coinciding with the longitudinal axis of said body, and in that the end of the body opposite the seal installation end and called seal removal end of said body is provided with anchoring members protruding from said end.

2. The seal installation/removal device as claimed in claim 1, wherein the anchoring members are arranged on a circle of center positioned on the axis of rotation of the revolving plate.

3. The seal installation/removal device as claimed in claim 1, wherein the seal removal end of said body has a flat surface and in that the anchoring members take the form of snugs or hooked teeth protruding from said flat surface.

4. The seal installation/removal device as claimed in claim 1, wherein said gripping handle forms a stick.

5. The seal installation/removal device as claimed in claim 4, wherein the stick is a telescopic stick.

6. The seal installation/removal device as claimed in claim 1, wherein the revolving plate is provided with a circular protuberance delimiting on the surface of the plate a circular recess.

7. The seal installation/removal device as claimed in claim 1, wherein the inclined ramps of the inner faces of the lugs are inclined to extend in parallel from one series of lugs to another when the inclinations of the slopes are identical.

8. A method for installing a seal of a group of a coffee machine, said group defining an open cavity, the bottom of which is provided with an annular groove for receiving the seal to be installed, the entry of the cavity, opposite said bottom, being provided with an internal circumferential wing with a face turned toward the bottom of the cavity, this face of the wing turned toward the bottom of the cavity being provided with inclined surfaces forming ramps separated from one another by apertures in the form of notches formed in said wing,
said method comprising the steps of, for the installation of the seal using a device conforming to claim 1, a step of positioning of the lugs of the installation end opposite the notches of the group and of axial introduction of the revolving plate prefitted with the seal to be installed inside the cavity before said body is driven in rotation about its longitudinal axis in a first direction of rotation to generate, by cooperation of the ramp-forming inclined surfaces of the wing with the inclined helical ramps of complementary form of the lugs of the body, an axial displacement of the body in the direction of convergence of the installation end of the body with the bottom of the cavity until the seal resting on the revolving plate is inserted into the annular groove.

9. The method for installing a seal of a group of a coffee machine as claimed in claim 8, wherein the method comprises, after the step of driving of said body in rotation about its longitudinal axis in a first direction of rotation, a step of driving of the body in rotation about its longitudinal axis in a second direction of rotation opposite the first direction of rotation to generate, by cooperation of the ramp-forming inclined surfaces of the wing with the inclined helical ramps of complementary form of the lugs of the body, an axial displacement of the body in the direction of separation of the installation end of the body from the bottom of the cavity of the group until the lugs of the removal end of the body are positioned opposite the notches of the wing in order for the body to be extracted axially from the interior of the cavity.

10. A method for removing a seal of a group of a coffee machine, said group defining an open cavity, the bottom of which is provided with an annular groove for receiving the seal to be dismounted, the entry of the cavity, opposite said bottom, being provided with an internal circumferential wing with a face turned toward the bottom of the cavity, this face of the wing turned toward the bottom of the cavity being provided with inclined surfaces forming ramps separated from one another by apertures in the form of notches formed in said wing, wherein the method comprises, for the dismounting of the seal using a device conforming to claim 1, a step of positioning of the lugs of the removal end opposite the notches of the wing and of axial introduction of the body into the cavity of the group, a step of driving of the body in rotation about its longitudinal axis in a first direction of rotation to generate, by cooperation of the ramp-forming inclined surfaces of the wing with the inclined helical ramps of complementary form of the lugs of the body, an axial displacement of the body in the direction of convergence of the removal end of the body with the bottom of the cavity of the group and consequently, the engagement of the anchoring members of the removal end of the body with the seal to be dismounted and a step of driving of the body in rotation about its longitudinal axis in a second direction of rotation opposite the first direction of rotation to generate, by cooperation of the ramp-forming inclined surfaces of the wing with the inclined helical ramps of complementary form of the lugs of the body, an axial displacement of the body in the direction of separation of the removal end of the body from the bottom of the cavity of the group until the lugs of the removal end of the body are positioned opposite the notches of the wing in order for the body to be extracted axially from the interior of the cavity.

\* \* \* \* \*